United States Patent [19]

Gerry

[11] Patent Number: 5,714,224
[45] Date of Patent: Feb. 3, 1998

[54] TUFTED CARPET AND PROCESS FOR PREPARING SAME

[75] Inventor: Stephen W. Gerry, Ponte Vedra Beach, Fla.

[73] Assignee: K2, Inc., Adrian, Mich.

[21] Appl. No.: 756,982

[22] Filed: Nov. 26, 1996

[51] Int. Cl.⁶ ............................................. B32B 3/02
[52] U.S. Cl. ................................... 428/95; 428/97
[58] Field of Search ................................ 428/95, 97

[56] References Cited

U.S. PATENT DOCUMENTS

| | | |
|---|---|---|
| Re. 34,951 | 5/1995 | Slosberg et al. . |
| 3,551,231 | 12/1970 | Smedberg . |
| 3,940,525 | 2/1976 | Ballard . |
| 4,153,749 | 5/1979 | Klein . |
| 4,522,857 | 6/1985 | Higgins . |
| 4,576,665 | 3/1986 | Machell ............................ 428/95 |
| 4,702,950 | 10/1987 | Slosberg et al. . |
| 4,808,459 | 2/1989 | Smith et al. . |
| 4,844,765 | 7/1989 | Reith . |
| 4,875,954 | 10/1989 | Griffiths et al. . |
| 5,283,097 | 2/1994 | Gillyns et al. . |
| 5,288,349 | 2/1994 | Fink . |
| 5,445,860 | 8/1995 | Bova . |
| 5,540,968 | 7/1996 | Higgins ............................ 428/95 |
| 5,558,916 | 9/1996 | Heim et al. ....................... 428/95 |
| 5,560,972 | 10/1996 | Blakely et al. ................... 428/95 |
| 5,612,113 | 3/1997 | Irwin, Sr. ......................... 428/95 |

*Primary Examiner*—Terrel Morris
*Attorney, Agent, or Firm*—Donald R. Fraser

[57] ABSTRACT

A tufted carpet comprises consecutively a primary backing stitched with loops of yarn to form a tufted structure projecting outwardly from the primary backing, a layer of latex, a layer of polyolefin, and a secondary backing comprising a woven polyolefin.

11 Claims, 1 Drawing Sheet

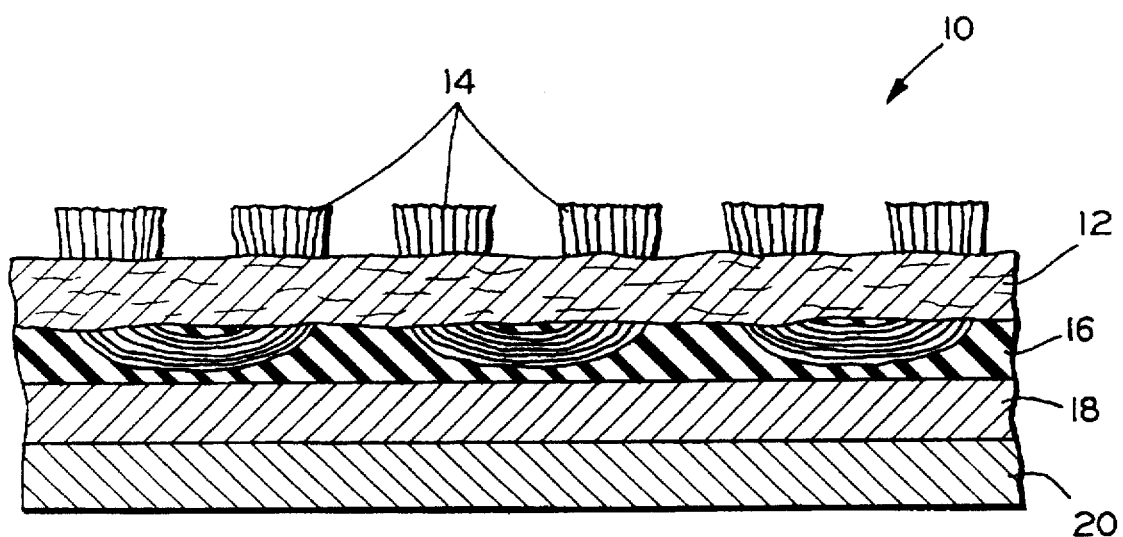

TUFTED CARPET AND PROCESS FOR PREPARING SAME

FIELD OF THE INVENTION

The present invention relates generally to a tufted carpet and a process for preparing same. More particularly, the invention is directed to a tufted carpet including, inter alia, a moisture barrier layer, and to a process for assembling various carpet components and laminating same to prepare a tufted carpet.

BACKGROUND OF THE INVENTION

It is well-known to prepare tufted carpet by stitching a primary backing material with yarn in such a manner so as to form on the top surface of the backing material a pile comprising numerous closely spaced erect loops of yarn. Typically, the bottom surface of the primary backing material is thereafter coated with a polymeric adhesive and a secondary backing material is adhered thereto. Finally, the assembled structure is passed through an oven and a compression zone to cure the polymeric adhesive and laminate the assemblage into a monolithic tufted carpet structure. By this process, the yarn tufts are banded to the primary backing material, and the secondary backing material is simultaneously banded to the tufted carpet structure.

While the production process of the prior art includes the insertion of a cured polymeric layer, many of the tufted carpet structures produced by this well-known process do not contain an effective moisture barrier because of inconsistencies in the application of the polymeric adhesive layer, the variableness of the heating and curing process, and the like.

U.S. Pat. No. 4,153,749 discloses a tufted carpet structure comprising consecutive layers of a tufted primary backing, a latex layer, a layer of an electrically conductive polymer, and a secondary backing. Such an assemblage results in a low static carpet, but does not insure that the tufted carpet will contain an effective moisture barrier.

It would be desirable to prepare a tufted carpet having an improved moisture barrier, by a commercially feasible process.

SUMMARY OF THE INVENTION

Accordant with the present invention there surprisingly has been discovered an improved tufted carpet, comprising:

a primary backing stitched with loops of yarn to form a tufted structure projecting outwardly from said primary backing;

a layer of latex affixed to the primary backing;

a layer of polyolefin affixed to the layer of latex; and a secondary backing, comprising a woven polyolefin, affixed to the layer of polyolefin.

The invention further includes a process for preparing a tufted carpet, comprising the steps of:

providing a primary backing stitched with loops of yarn to form a tufted structure projecting outwardly from said primary backing;

providing a secondary backing, comprising a woven polyolefin;

applying a layer of polyolefin onto the secondary backing;

interposing a layer of latex between the primary backing and the polyolefin layer; and laminating together the primary backing, latex layer, polyolefin layer, and secondary backing.

The tufted carpet according to the present invention, as well as the process for making same, is particularly well suited for producing carpeting for use in commercial and residential buildings, motor vehicles, and the like.

BRIEF DESCRIPTION OF THE DRAWING

The novel features that are considered characteristics of the invention are set forth with particularity in the appended claims. The invention itself, however, will best be understood from the accompanying description of specific embodiments, when read in conjunction with the attendant drawing, in which:

The FIGURE is a side elevational view of an embodiment of a tufted carpet according to the present invention.

DETAILED DESCRIPTION OF THE PREFERRED EMBODIMENTS

Referring now to the FIGURE, there is shown generally at 10 a schematic, side elevational view of an embodiment of a tufted carpet according to the present invention. The tufted carpet comprises a primary backing 12 stitched with loops of yarn 14 to form a tufted structure projecting from the primary backing 12. A layer of latex 16 is affixed to the underside of the primary backing 12 which effectively locks the loops of yarn 14 thereto. A layer of a polyolefin 18 is affixed to the layer of latex 16 which effectively provides a moisture barrier for the tufted carpet 10. A secondary backing 20 is affixed to the layer of polyolefin 18. The secondary backing 20 provides dimensional stability and rigidity to the tufted carpet 10, thereby facilitating the handleability of same.

The primary backing which is stitched with the pile yarn can be any sheet material conventionally used as the primary backing of a tufted carpet. Useful primary backing materials include, but are not necessarily limited to, woven jute, woven cotton fabric, woven and non-woven fabrics made from synthetic fibers such as, for example, polypropylene, polyethylene, polyamide, polyester, or rayon, and the like, as well as blends, combinations, and copolymers thereof.

Tufting is conventionally accomplished by inserting reciprocating needles threaded with yarn into the primary backing to form tufts or loops of yarn which project outwardly from one of the major surfaces of the primary backing. Useful materials from which the loops of yarn may be prepared include, but are not necessarily limited to, polyester, polyamide, polypropylene, polyethylene, polyurethane, polycarbonate, polyacetal, nylon, and the like, as well as blends, combinations, and copolymers thereof.

Primary backing materials stitched with loops of yarn to form a tufted structure projecting outwardly from one of the major surfaces thereof which are useful for manufacturing multilayered carpet structures are commercially available and well-known in the art. A preferred primary backing containing tufts of yarn maybe obtained from Mohawk Industries, Inc. under the product designation Bigelow.

The latex according to the present invention may be, without limitation, a natural rubber compound or preferably a synthetic elastomer such as, for example, butadiene-styrene, butadiene-acrylonitrile, butadiene-styrene-acrylonitrile, chloroprene, and the like. Also contemplated are the above mentioned synthetic elastomers, further containing vinylpyridine and/or an acidic monomer such as, for example, methacrylic acid. Moreover, the polymer phase of the latex may contain a functional group resulting from the use of an unsaturated monomer containing a carboxy group; e.g., a carboxylated styrene-butadiene.

The latex layer may be formed by merely drying the latex, or the latex may contain a vulcanizing or curing ingredient and/or an accelerator such as, for example, a dithiocarbonate. Thus, latex compounds which must be cured in order to form the latex layer according to the present invention are typically subjected to a heating operation during the lamination step. conveniently, the heating temperature may be up to about 250° F., and may be effected by any conventional means such as, for example, a gas fired oven. The amount of latex required to lock and encapsulate the loops of yarn to the primary backing varies from about 10 to about 40 ounces per square yard, depending upon the latex used, the type of primary backing, the nature and quantity of the loops of yarn, etc. A preferred latex is available from Goodyear under the product designation SBR.

The polyolefin layer according to the present invention may be prepared from polyolefins selected from, but not necessarily limited to, high, medium, or low density polyethylene, polypropylene, polybutylene, and the like, as well as blends and copolymers thereof. A preferred polyolefin is linear low density polyethylene. The polyolefin layer may have a thickness ranging from about 0.001 inch to about 0.4 inch, and may either be clear or pigmented. A preferred linear low density polyethylene, from which the polyolefin layer may be extrusion coated, may be obtained from Chevron Corporation under the product designation #1017.

The secondary backing according to the present invention comprises a polyolefin film including reinforcing filaments. Examples of useful polyolefin materials include, but are not necessarily limited to, high, medium, and low density polyethylene, polypropylene, polybutylene, and the like, as well as blends and copolymers thereof. A preferred polyolefin is high density polyethylene. The reinforcing filaments may comprise conventional materials such as, for example, glass or metal fibers, or polymeric fibers made from polyester, acrylic, polycarbonate, and the like, as well as blends, combinations, and copolymers thereof. The reinforcement filaments are present in the woven polyolefin fabric in a concentration from about a 4×2 to about a 24×24 tape count per inch. A preferred woven polyolefin may be obtained from Amoco Fabric & Fibers Division under the product designation Style #3808.

The present invention moreover contemplates a method for preparing a tufted carpet. A primary backing stitched with loops of yarn to form a tufted structure projecting outwardly from the primary backing is provided. A secondary backing, comprising a woven polyolefin, is likewise provided. A layer of polyolefin is then applied to the secondary backing. Thereafter, a layer of latex is interposed between the primary backing and the polyolefin layer. Finally, the assemblage of laminae are laminated together, to form the tufted carpet of the present invention having a pin-hole-free polyolefin moisture barrier.

In operation, the polyolefin layer is applied to the secondary backing by conventional means such as, for example, by extrusion coating. The polyolefin may be melted in any conventional extrusion apparatus generally known in the art and discharged as a curtain of polyolefin material onto a moving web of the woven polyolefin secondary backing. Generally, the extrusion die is maintained at a temperature from about 400° F. to about 700° F., depending upon the polyolefin utilized, the thickness of the layer of polyolefin desired, the rate of advance of the secondary backing web, etc. Preferably, the extrusion temperature ranges from abut 580° F. to about 625° F.

The layer of latex is interposed between the primary backing and the polyolefin layer which has been applied to the secondary backing. This may be accomplished by conventional means such as, for example, by roll coating, spraying, brushing, doctor blading, or otherwise applying the latex to either the primary backing or the layer of polyolefin. Such methods of application are well-known in the art. After the latex has been applied, the primary backing is brought into contact with the layer of polyolefin which is carried on the secondary backing, and the resultant assemblage is thereafter laminated together.

The lamination process employed will depend upon the nature of the latex interposed between the primary backing and the polyolefin layer. Where the latex is an adhesive, the lamination process may comprise merely compressing the assemblage between a series of rolls or a belt press. Where the latex is to be cured, the lamination process conveniently will include heating the assemblage. Typical lamination pressures range from about 10 pounds per linear inch to about 200 pounds per linear inch. Where the assemblage is to be heated in order to cure the latex during the lamination process, temperatures up to about 350° F. may be employed. Methods for laminating the tufted carpet laminae according to the present invention are well-known in the art.

It must be noted that the disclosed process conditions and materials are not sharply critical for the successful preparation of a tufted carpet, according to the present invention. The process conditions and materials of construction described hereinabove are generally disclosed in terms which are conventional in the art to the practice of the invention. Occasionally, however, the process conditions and materials as described may not be precisely applicable for each structure included within the disclosed scope. Those instances where this occurs will be readily recognizable by those ordinarily skilled in the art. In all such cases, either the process or materials may be modified in a conventional manner known to those ordinarily skilled in the art, e.g., by increasing or decreasing lamination temperatures and/or pressures, by varying the thicknesses of various laminae, by routine substitutions of operable materials, etc., or other process conditions or materials which are otherwise conventional will be applicable to the present invention.

From the foregoing description, one ordinarily skilled in the art can easily ascertain the essential characteristics of this invention and, without departing from its spirit and scope, can make various changes and modifications to adapt the invention to various uses and conditions.

What is claimed is:

1. A tufted carpet, comprising:
   a primary backing stitched with loops of yarn to form a tufted structure projecting outwardly from said primary backing;
   a layer of latex affixed to the primary backing;
   a layer of polyolefin affixed to the layer of latex; and
   a secondary backing, comprising a woven polyolefin, affixed to the layer of polyolefin.

2. The tufted carpet according to claim 1, wherein the primary backing is prepared from jute, cotton, or synthetic fibers selected from polypropylene, polyethylene, polyamide, polyester, and rayon, as well as blends, combinations, and copolymers thereof.

3. The tufted carpet according to claim 1, wherein the loops of yarn are prepared from polyester, polyamide, polypropylene, polyethylene, polyurethane, polycarbonate, polyacetal, on nylon, as well as blends, combinations, and copolymers thereof.

4. The tufted carpet according to claim 1, wherein the latex is a synthetic elastomer.

5. The tufted carpet according to claim 1, wherein the latex is affixed to the primary backing in an amount from about 10 to about 40 ounces per square yard.

6. The tufted carpet according to claim 1, wherein the polyolefin layer is selected from high, medium, and low density polyethylene, polypropylene, and polybutylene, as well as blends and copolymers thereof.

7. The tufted carpet according to claim 6, wherein the polyolefin layer is low density polyethylene.

8. The tufted carpet according to claim 1, wherein the polyolefin layer ranges in thickness from about 0.001 to about 0.4 inch.

9. The tufted carpet according to claim 1, wherein the secondary backing comprises a polyolefin film selected from high, medium, and low density polyethylene, polypropylene, and polybutylene, as well as blends and copolymers thereof.

10. The tufted carpet according to claim 1, wherein the secondary backing comprises reinforcing fibers selected from glass, metal, polyester, acrylic, and polycarbonate fibers, as well as blends, combinations, and copolymers thereof.

11. The tufted carpet according to claim 1, wherein the secondary backing reinforcing fibers are present in a concentration from about 4×2 to about 24×24 tape count per inch.

* * * * *